A. L. SNOW.
VEHICLE SPRING.
APPLICATION FILED JUNE 30, 1908.
997,470.
Patented July 11, 1911.
2 SHEETS—SHEET 2.
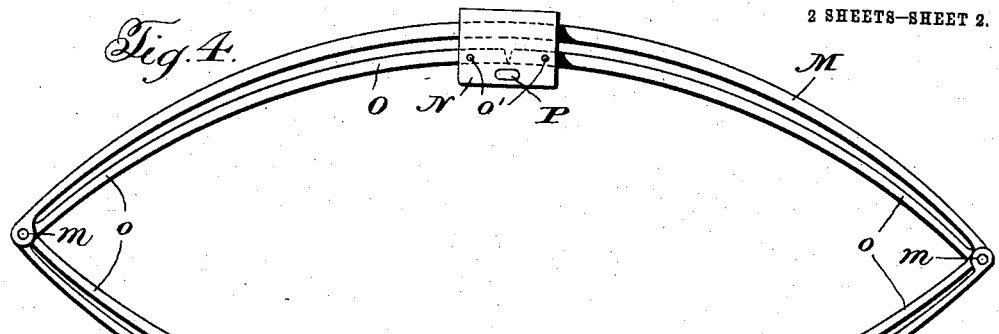
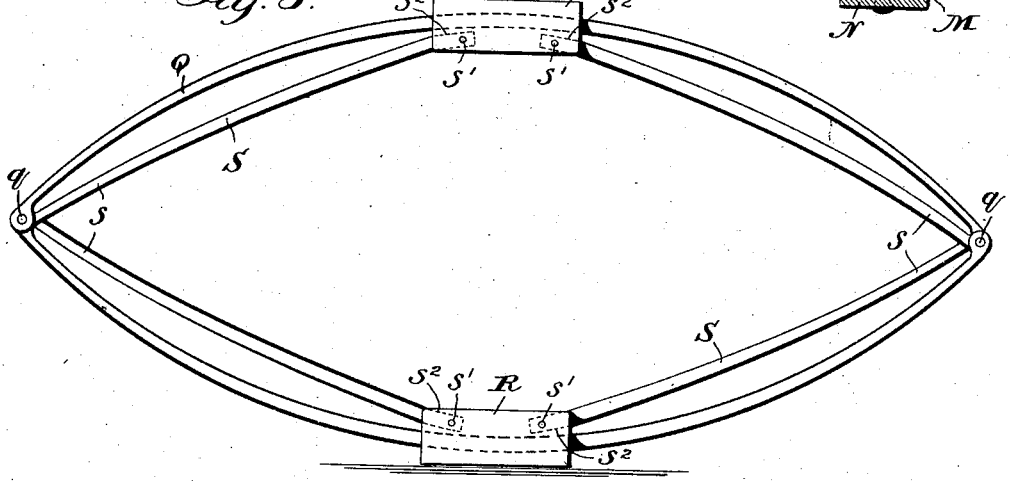
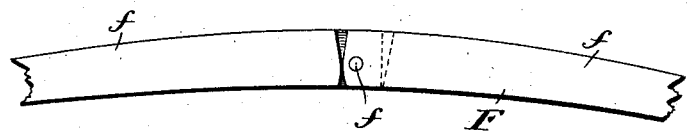
Witnesses:
Jas. E. Hutchinson
Thos. R. Heath
Inventor:
A. L. Snow,
By ........... Attorneys

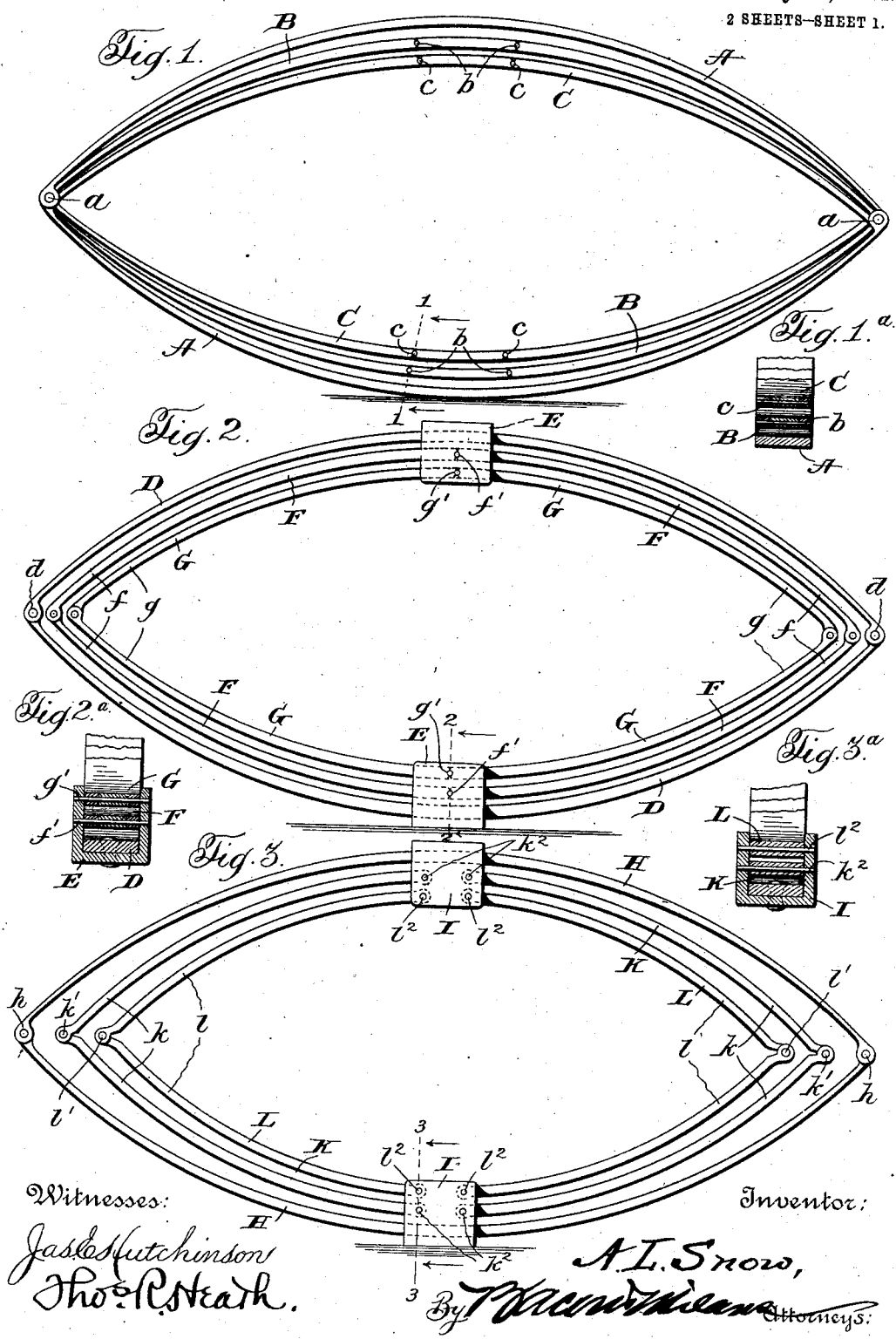

UNITED STATES PATENT OFFICE.

ARTHUR LELAND SNOW, OF KINGFISHER, OKLAHOMA, ASSIGNOR TO GRACE C. SNOW, OF COMFORT, TEXAS.

VEHICLE-SPRING.

997,470.  Specification of Letters Patent.  Patented July 11, 1911.

Application filed June 30, 1908. Serial No. 441,187.

*To all whom it may concern:*

Be it known that I, ARTHUR L. SNOW, a citizen of the United States, residing at Kingfisher, in the county of Kingfisher and State of Oklahoma, have invented certain new and useful Improvements in Vehicle-Springs, of which the following is a specification, reference being had therein to the accompanying drawing.

This invention relates to an improvement in springs, designed particularly for use upon carriages, wagons, and motor or other cars, and more particularly to that type of spring known as elliptic or semielliptic springs.

The object of the present invention is the provision of a spring of this character which is so constructed that it will automatically adapt itself to the load which is to be supported, whether the same be heavy or light.

The invention broadly stated, comprises a primary spring which is adapted to be maintained under compression during normal conditions, and a secondary or a plurality of secondary springs which are adapted to be placed under compression only when the load is increased, said springs being designed to be brought into action successively.

In the drawings forming a part of this specification, I have shown several preferred embodiments of the invention, but it will be understood that the springs may be constructed in many different ways without departing from the spirit of the invention as defined in the appended claims.

In the drawings, wherein like numerals of reference refer to similar parts in the several views, Figure 1 is a side elevation of an elliptic spring constructed in accordance with my invention, Fig. 2 is a similar view showing a modified form of the invention, Fig. 3 is a similar view showing still another modified form of the invention, and Figs. 4 and 5 are similar views showing further modifications of the invention, and Fig. 6 is a detail view. Figs. 1ª, 2ª, 3ª and 4ª are sections on the lines indicated in the respective figures.

Referring now more particularly to the drawing, in the form of the invention disclosed in Fig. 1, the spring comprises two oppositely arranged elliptic springs A A, the ends of which are connected by the usual hinged joints *a a*. Lying within the elliptic spring thus formed are a plurality of secondary or supplemental elliptic springs, which are designed to be successively brought into play when an excessive load is placed upon the springs A A, in the manner to be hereinafter more particularly set forth. In the form of the invention disclosed in Fig. 1, I have shown two such supplemental springs, which are formed of oppositely disposed semi-elliptic members B B and C C, the ends of which are connected at the hinged joints *a a*, heretofore referred to. The semi-elliptic members B B and C C which form the supplemental springs are each formed, in the form of the invention disclosed in Fig. 1 in three sections, an intermediate section and two end sections. The intermediate sections of the members B B are hingedly connected to the end sections thereof by means of suitable pintles *b b*, the construction being such that under normal conditions of the members B B, a small V-shaped space will be left between the adjacent ends of the middle and the end sections thereof above and below the hinge pintles which connect the same. The intermediate sections of the members C C are hingedly connected in a like manner to the end sections thereof by hinge pintles *c c*, the only difference in the construction being that in the case of the members C C, the V-shaped spaces which are left between the adjacent ends of the intermediate and end sections are slightly greater in width than the spaces between the adjacent ends of the intermediate and end sections of the members C C.

Under light loads the semi-elliptic members A A only are placed under compression and the supplemental springs formed by the members B B and C C will not be compressed owing to the sectional character thereof. If, however, the load is increased beyond a predetermined point, the sections forming the members B B will be moved until the V-shaped spaces between the adjacent ends thereof are closed and said ends are caused to abut. The members B B then become in effect rigid members and serve to assist the members A A in supporting the load. As the spaces between the adjacent ends of the sections forming the members C C are wider than the spaces between the ends of the sections of the members B B it is obvious that the members C C will not be placed under compression unless the load is excessive and then not until after the members B B are placed under compression. To avoid friction, the ends of the sections of the members B B and C C which are arranged to abut, are preferably rounded slightly.

In the form of the invention disclosed in Fig. 2, the spring comprises two oppositely arranged continuous semi-elliptic springs D D, the ends of which are connected by the usual hinged joint $d\ d$ and rigidly secured in any suitable manner over the intermediate portions of the oppositely disposed members D D are oppositely disposed U-shaped saddles E E. Lying within the elliptic spring thus formed are two supplemental elliptic springs, one of which is formed of two oppositely disposed semi-elliptic members, F F, and the other of which is formed of two oppositely disposed semi-elliptic members G G. The semi-elliptic members F F are each formed in two sections $f\ f$, the outer ends of which are connected by a hinge joint of any suitable construction and the inner ends of which are adapted to lie between the side walls of the saddles E E heretofore referred to, and to be pivotally connected by hinged pintles $f'\ f'$ which pass through the side walls of said saddles. The inner ends of the sections $f\ f$ of the members F F are so pivoted that a small V-shaped space will be left therebetween above and below the pintles connecting the same, when said members are in normal position, so that after the members D D have been compressed to a given extent, said ends will abut and the members F F will then also be placed under compression. The semi-elliptic members G G are each formed in two sections $g\ g$, the outer ends of which are connected by a hinge joint of any suitable construction, and the inner ends of which are adapted to lie between the side walls of the saddles E E and to be pivotally connected together by pintles $g'\ g'$. The inner pivoted ends of the members $g\ g$ are similar in construction to the inner pivoted ends of the sections $f\ f$ heretofore described except that the V-shaped spaces therebetween are slightly wider than the spaces between the ends of the sections $f\ f$, so that the supplemental spring formed by the members G G will not be brought into action until after the supplemental spring formed by the members F F has been compressed to a predetermined extent.

In the form of the invention disclosed in Fig. 3, the spring comprises two oppositely arranged continuous semi-elliptic springs H H, the ends of which are connected by the usual hinge joints $h\ h$. Rigidly secured to and straddling the intermediate portions of the oppositely disposed members H H are oppositely disposed U-shaped saddles I I. Lying within the spring formed by the two oppositely disposed members H H, are two supplemental springs K and L. The spring K is formed of two pairs of oppositely disposed sections $k\ k$, the outer ends of which are pivotally connected by means of suitable pintles $k'$, and the inner ends of which extend between the walls of the saddles I I and are pivotally connected thereto by means of pintles $k^2$ which pass therethrough. The spring L lies within the spring K and is similarly formed of two pairs of oppositely disposed sections $l\ l$, the outer ends of which are pivotally connected by means of suitable pintles $l'$ and the inner ends of which extend between the side walls of the saddles I I and are pivotally connected thereto by means of pintles $l^2$ which pass therethrough. The ends of the sections $k\ k$ which are connected by the pintles $k'$ are so fashioned that a small V-shaped space is normally left therebetween, which permits said sections to be moved toward each other for a limited distance, after which the ends thereof will abut, and the ends of the sections $l\ l$ which are connected by means of the pintles $l'$ are similarly fashioned so that a small V-shaped space is normally left therebetween, the only difference in construction being that the space normally left between the ends of the sections $l\ l$ is somewhat greater than that left between the ends of the sections $k\ k$. In the operation of the spring thus described, if the load is a light one only the members H H will be placed under compression. If, however, the load is increased until the ends of the sections $k\ k$ are caused to abut, it is obvious that such sections will also be placed under compression, and if the load is still further increased until the ends of the sections $l\ l$ are caused to abut, it is apparent that these sections will likewise be placed under compression.

In the form of the invention disclosed in Fig. 4, the spring comprises two oppositely arranged continuous semi-elliptic springs M M, the ends of which are connected by the usual hinge joints $m\ m$. Rigidly secured to and straddling the intermediate portions of the oppositely disposed springs M M are oppositely disposed U-shaped saddles N N. Lying within the elliptic spring formed by the two oppositely disposed springs M M, is a supplemental elliptic spring O. The elliptic spring O is formed of two pairs of oppositely disposed sections $o, o$, the outer ends of each pair of which are pivotally connected by means of the hinge joints $m\ m$ which connect the semi-elliptic springs M M. The inner ends of the two upper sections $o\ o$ extend between the side walls of the saddle N secured to the upper spring M and are pivotally connected thereto by pintles $o'$ which pass through the sections a slight distance from the inner ends thereof, said ends being in close proximity to each other. Passing through the side walls of the U-shaped saddle N secured to the upper spring M and directly below the inner ends of the sections o o is a bar P, the inner ends of the sections o o being positioned under normal conditions of the spring a slight distance above said bar. The inner ends of the lower sections o o extend between the side walls of the saddle N secured to the lower spring M and are pivotally connected thereto by pintles $o^2$ which pass through the sections a slight distance from the inner ends thereof, said ends being in close proximity to each other. Passing through the side walls of the U-shaped saddle N secured to the lower spring M and directly above the inner ends of the sections o o is a bar P', the inner ends of said sections being positioned under normal conditions of the spring a slight distance below said bar. In the operation of the spring thus described when a light load is applied to the spring, only the members M M will be placed under compression, the sections o which make up the supplemental spring merely moving on their pivot until the spring has been compressed a sufficient extent to bring the inner end of the sections o into contact with the bars P and P', which locks said sections against further movement on their pivot and forms of the several sections an elliptic spring which is formed of two substantially rigid semi-elliptic springs and which will assist the spring formed of the semi-elliptic springs M M in supporting the load. While I have described only one supplemental spring in this form of the invention, it is obvious that as many as desired may be employed and that the pins P and P' can be located so as to cause said supplemental springs to be brought into action successively.

In the form of the invention disclosed in Fig. 5, the spring comprises two oppositely disposed semi-elliptic springs Q Q, the ends of which are connected by the usual hinged joints q q. Rigidly secured to and straddling the intermediate portions of the oppositely disposed springs Q Q are oppositely disposed U-shaped saddles R R. Lying within the elliptic spring formed by the two oppositely disposed elliptic springs Q Q is a supplemental elliptic spring S, which is formed of two pairs of oppositely disposed sections s s, the outer ends of each pair of which are pivotally connected by means of the hinge joints q q which connect the ends of the semi-elliptic springs Q Q. The inner ends of the two upper sections s s extend between the side walls of the saddle R secured to the upper spring Q and are pivotally connected thereto by pintles s' which pass through the extreme outer ends thereof, while the inner ends of the two lower sections s s extend between the side walls of the saddle R secured to the lower spring Q and are pivotally connected thereto by similar pintles s' which pass through the extreme inner ends thereof. The inner ends of the several sections s are provided adjacent the points of their pivotal connection with the saddles R R with angularly disposed portions $s^2$, the angularly disposed portions of the two upper sections being adapted when the spring is in normal position to lie a short distance below the inner surface of the portion of the upper spring Q which is positioned within the saddle R, while the angularly disposed portions of the lower sections are adapted when the spring is in normal position to lie a short distance above the upper surface of the portion of the lower spring Q which is positioned within the saddle R. In the operation of the spring thus described the load will be initially borne, if a light one, by the spring which is formed of the semi-elliptic springs Q Q, the several sections s, which make up the supplemental springs S moving idly on their pivots. As soon as a sufficient load is applied to the spring, however, to cause the angularly disposed portions $s^2$ of the upper and lower sections of the supplemental spring to contact respectively with the under and upper surfaces of the springs Q Q it will be apparent that the sections s will be locked against further movement on their pivots and will be placed under compression. It will be obvious that as many supplemental springs S as desired may be employed.

While in the drawings, the invention is illustrated as applied to elliptic springs only, it is obvious that the same construction can be used with springs of the semi-elliptic and quarter elliptic type and the use of the word elliptic in the appended claims is to be understood as including such types of springs.

While a convenient embodiment of the invention is illustrated in the accompanying drawings, it will be understood that many changes may be made to the form and constructions shown therein without departing from the spirit and scope of the invention as defined in the appended claims.

Having thus described the invention, what is claimed is:—

1. A device of the character described, comprising a continuous leaf spring, and a leaf spring associated therewith formed of a plurality of pivoted sections, said pivoted sections being provided with portions designed to abut after a predetermined movement of the spring.

2. A device of the character described, comprising a primary leaf spring, a supplemental leaf spring associated therewith and formed of a plurality of pivotally connected sections, and means for locking the sections of the secondary spring against relative movement after a predetermined amount of movement on their pivots to bring said secondary spring into action after a predetermined amount of movement of the primary spring.

3. A device of the character described comprising a primary elliptic spring, and a plurality of secondary elliptic springs positioned within said primary spring and connected thereto so as to move therewith, said secondary springs being each formed of a plurality of pivoted sections, and means for successively locking the pivoted sections of said secondary springs against relative movement after a predetermined amount of movement of the primary spring.

4. In a device of the character described, a primary elliptic spring, and a plurality of secondary elliptic springs positioned within said primary spring and connected thereto so as to move therewith, said secondary springs being adapted to act successively and being each formed of a plurality of pivoted sections, said pivoted sections being provided with portions adapted to abut after a predetermined movement of the spring.

5. A device of the character described, comprising a primary elliptic spring, a secondary elliptic spring positioned within said primary elliptic spring, and a connection between said elliptic springs to cause the same to move in unison, said secondary elliptic spring being formed of a plurality of pivoted sections provided with portions designed to abut and cause the secondary spring to act after a predetermined amount of movement of the primary spring.

6. A device of the character described comprising a continuous leaf spring, and a leaf spring associated therewith formed of pivoted sections, said sections being free to move on their pivots until the spring has been placed under compression to a predetermined extent, and means for locking said sections against further movement on their pivots.

7. In a device of the character described, a continuous leaf spring, a supporting member carried thereby, a supplemental leaf spring pivoted to said supporting member, and means for locking said supplemental spring member against movement on its pivot.

8. In a device of the character described, a continuous leaf spring, a supporting member secured to said spring intermediate the ends thereof, a pair of spring members pivoted to said supporting member, and means for locking said spring members against movement on their pivots.

9. In a device of the character described, a continuous leaf spring, a supporting member secured to said spring intermediate the ends thereof, a pair of spring members pivoted to said supporting member, said spring members being provided with portions adapted to abut to lock the spring members against relative movement.

10. A spring comprising a primary leaf spring, a pivoted supplemental leaf spring pivotally supported by said primary leaf spring, and means for locking said supplemental spring against movement on its pivot after a predetermined amount of movement of the primary spring.

In testimony whereof I affix my signature in presence of two witnesses.

ARTHUR LELAND SNOW.

Witnesses:
WILLIAM O. CUNNINGHAM,
L. B. MANLEY.

---

Copies of this patent may be obtained for five cents each, by addressing the "Commissioner of Patents, Washington, D. C."